73392 *J. B. Sexton's Cultivator*
Assigned to Self & John L. Andrew

PATENTED
JAN 14 1868

Witnesses:
Theo Inche
J. A. Fraser

Inventor:
J. B. Sexton
Per Munn & Co.
Attorneys

United States Patent Office.

JAMES B. SEXTON, OF PELLA, IOWA, ASSIGNOR TO HIMSELF AND JOHN L. ANDREW, OF SAME PLACE.

Letters Patent No. 73,392, dated January 14, 1868.

IMPROVEMENT IN CULTIVATORS.

*The Schedule referred to in these Letters Patent and making part of the same.*

TO ALL WHOM IT MAY CONCERN:

Be it known that I, JAMES B. SEXTON, of Pella, in the county of Marion, and State of Iowa, have invented a new and useful Improvement in Cultivators; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish a simple, cheap, convenient, and durable cultivator; and it consists in the construction, combination, and arrangement of the various parts, as hereinafter more fully described.

Figure 1:
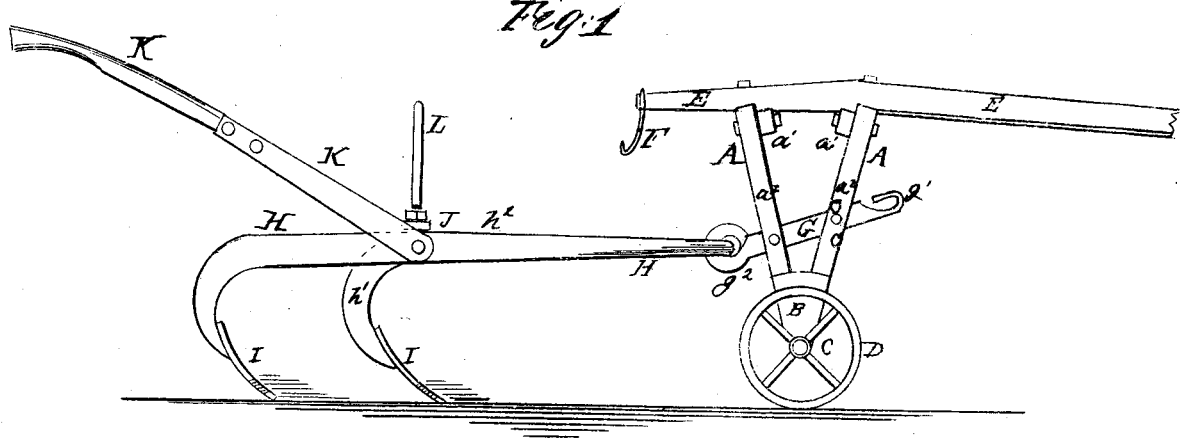
Figure 1 is a side view of my improved cultivator.
Figure 2:
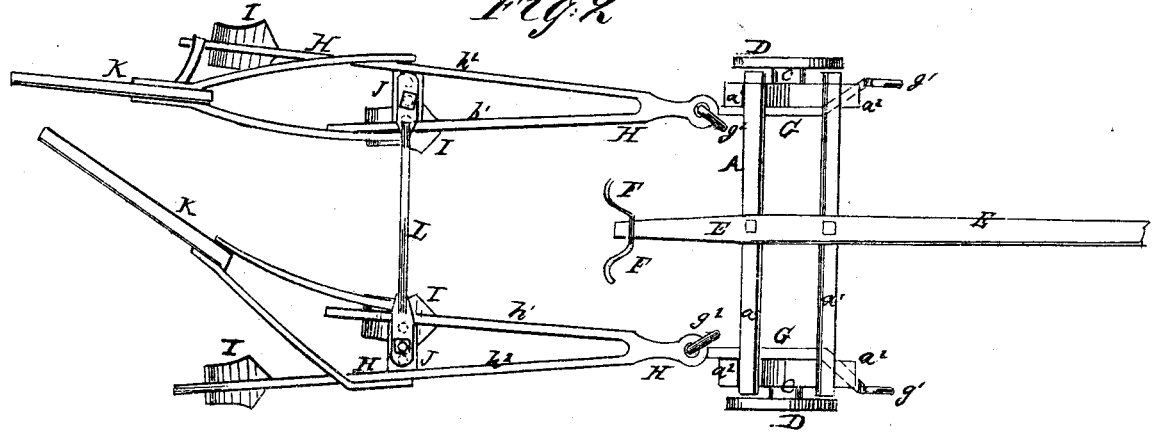
Figure 2 is a top or plan view of the same.

A are two frames, each of which is formed by attaching a cross-bar, $a^1$, to the upper ends of the end bars $a^2$. The lower ends of the end bars $a^2$ are attached to plates B, attached to or formed upon the axles C, upon which the wheels D work. E is the tongue, which is attached to the middle part of the cross-bars $a^1$, as shown in fig. 2. The rear end of the tongue E projects, as shown in the drawings, and has hooks F attached to it, upon which the cultivator-frames may be hooked while transporting the cultivator from place to place. To the sides of the end bars $a^2$ are bolted the bars G, having hooks $g^1$ formed upon their forward ends for the attachment of the whiffle-trees. Upon the rear ends of the bars G are formed spiral or twisted hooks, $g^2$, for the attachment of the cultivator-frames, so that the said frames may not become detached when moved about, or when raised up for transportation. The forward end bars $a^2$ of the forward frame A should have two or more holes formed through them, for the reception of the bolts, by which the bars G are secured to said end bars $a^2$, so that the said bars G may be adjusted as required, to cause the ploughs to run at a greater or less depth in the ground, as may be required. It should be observed that the bars G may be attached to the inner or outer sides of the bars $a^2$ of the frame A, according as it is desired to have the cultivators work closer together or farther apart. H are the cultivator-beams, the forward ends of each pair of which are rigidly attached or formed solid with each other, and have an eye formed in them for hooking upon the hooks $g^2$. The beams $h^1 h^2$ of each pair curve outward from their point of contact with each other, as shown in fig. 2. This construction enables the ploughs I to be attached more squarely to the curved rear ends of said beams. The rear parts of the beams $h^1 h^2$ of each pair are rigidly connected to each other, strengthened, and held in their proper relative positions by the cross-bars J, as shown in the drawings. K are the handles, which are curved to one side, so that the operator may walk upon one side of the row of plants being cultivated. L is a bar or yoke, curved edgewise, to enable it to be made lighter, and yet have the requisite strength, and the ends of which are adjustably and removably secured to the bars J, by bolts passing through the ends of the said curved bar or yoke, and through one or the other of the holes formed through the bars J for their reception, according as the cultivators are required to work closer together or farther apart.

I claim as new, and desire to secure by Letters Patent—

1. The adjustable iron bars G, constructed substantially as herein shown and described, and adjustably attached to the end bars $a^2$ of the frame A, as and for the purposes set forth.

2. The beams H, constructed substantially as herein shown and described, that is to say, curved outward at their forward ends, and strengthened at their rear ends by the cross-bars J, as and for the purposes set forth.

3. The curved adjustable bar or yoke L, curved edgewise, and adjustably bolted to the cross-bars J, substantially as herein shown and described, and for the purpose set forth.

JAMES B. SEXTON.

Witnesses:
H. M. McCULLY,
HENRY NOLLEN, Jr.